(12) United States Patent
Dörr et al.

(10) Patent No.: US 7,971,887 B2
(45) Date of Patent: Jul. 5, 2011

(54) METHOD OF MAKING A SUBFRAME OF A MOTOR VEHICLE, AND SUBFRAME FOR A MOTOR VEHICLE

(75) Inventors: Jochen Dörr, Bad Driburg (DE); Michael Wibbeke, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 298 days.

(21) Appl. No.: 12/108,098

(22) Filed: Apr. 23, 2008

(65) Prior Publication Data
US 2008/0265626 A1 Oct. 30, 2008

(30) Foreign Application Priority Data
Apr. 24, 2007 (DE) .......... 10 2007 019 590

(51) Int. Cl.
*B62D 21/00* (2006.01)

(52) U.S. Cl. ......... 280/124.109; 164/111; 280/781; 180/311; 180/312; 29/897.2; 29/527.5; 296/30

(58) Field of Classification Search ......... 280/124.109, 280/785, 781; 180/299, 311, 312; 164/110, 164/98, 108, 111, 322; 296/30, 29, 204, 296/205, 203.03; 29/897.2, 895.32, 402.07, 29/402.18, 424, 526.2, 527.3, 527.5, 33 C, DIG. 5, DIG. 8, DIG. 10
See application file for complete search history.

(56) References Cited

U.S. PATENT DOCUMENTS

| | | | | |
|---|---|---|---|---|
| 1,113,265 | A | * | 10/1914 | Viard .................. 220/752 |
| 4,145,068 | A | * | 3/1979 | Toyomasu et al. ......... 280/281.1 |
| 5,096,010 | A | * | 3/1992 | Ojala et al. ................ 180/68.3 |
| 5,381,849 | A | | 1/1995 | Fussnegger et al. |
| 6,216,763 | B1 | * | 4/2001 | Ruehl et al. ................... 164/98 |

FOREIGN PATENT DOCUMENTS

| | | |
|---|---|---|
| DE | 378 634 | 7/1923 |
| DE | 196 42 833 C | 4/1998 |
| DE | 101 13 962 A1 | 10/2002 |
| DE | 102 57 263 A1 | 6/2004 |
| WO | WO 95/29024 | 11/1995 |

* cited by examiner

*Primary Examiner* — Ruth Ilan
*Assistant Examiner* — Keith Frisby
(74) *Attorney, Agent, or Firm* — Henry M. Feiereisen; Ursula B. Day

(57) ABSTRACT

In a method of making a subframe of a motor vehicle profile elements made of hollow sections of steel are placed in a casting tool. Subsequently, aluminum material is filled into the casting tool to casting around the profile elements so as to form plural cast nodes on the profile elements in spaced-apart relationship.

17 Claims, 3 Drawing Sheets

METHOD OF MAKING A SUBFRAME OF A MOTOR VEHICLE, AND SUBFRAME FOR A MOTOR VEHICLE

CROSS-REFERENCES TO RELATED APPLICATIONS

This application claims the priority of German Patent Application, Serial No. 10 2007 019 590.9, filed Apr. 24, 2007, pursuant to 35 U.S.C. 119(a)-(d), the content of which is incorporated herein by reference in its entirety as if fully set forth herein.

BACKGROUND OF THE INVENTION

The present invention relates to a method of making a subframe of a motor vehicle, and to a subframe for a motor vehicle.

Nothing in the following discussion of the state of the art is to be construed as an admission of prior art.

Contemporary motor vehicles have subframes to receive components of the chassis and/or drive unit of the motor vehicle. Subframes are thus also part of the vehicle axle and stiffen the front structure and/or the rear structure. Therefore, subframes are firmly secured to the body of the passenger vehicle.

Stiffness of a subframe is crucial because it is subject to high static and dynamic forces during normal travel. As a result, subframes are complex components which must meet increasingly more stringent standards. On one hand, the deformation behavior must be optimized in the event of a crash, and yet the subframe should be lightweight and at the same time rigid and torsionally stiff.

To address the complexity issue of the geometry in the area of the attachment points, cast nodes of aluminum have been provided in the area of the axle and connected via profile elements made in particular as extruded intermediate pieces. This approach is very expensive in view of the exclusive use of aluminum. Moreover, the need for a welding joint to connect the cast nodes with the extruded profile is problematic in view of the different alloy composition and the substantial difference in the geometry. As hollow and thus lightweight castings are difficult to make and thus expensive, ribbed open structures are used. Such ribbed structures exhibit, however, inadequate torsion stiffness when compared to closed steel pipe or shell structures, especially when correlating the torsion stiffness to the mass of the profile element.

Other shortcomings of aluminum include the small modulus of elasticity of aluminum which translates to a reduced stiffness in particular when small-volume structures are involved. The size of a structure cannot fall below a certain minimum level, despite the tight space available. To still realize the necessary stiffness, extruded profiles would have to be made thicker. This, however, is not an economically viable solution. On the other hand, the outer dimensions of the profile elements cannot be increased in view of space limitations. Ribbed cast nodes thus are inadequate to have the desired torsion stiffness.

It would therefore be desirable and advantageous to address this problem and to obviate other prior art shortcomings.

SUMMARY OF THE INVENTION

According to one aspect of the present invention, a method of making a subframe of a motor vehicle includes the steps of placing profile elements made of hollow sections of steel in a casting tool, and filling aluminum material into the casting tool to cast around the profile elements so as to form plural cast nodes on the profile elements in spaced-apart relationship.

The present invention resolves prior art problems by placing the profile elements of steel in a casting tool in which a cast node of aluminum is formed around each of the profile elements. A material union of aluminum and steel is normally very difficult to realize and requires particular welding processes, such as pressure welding, which are unsuitable for making complex structures, as is the case here. The present invention addresses this problem by employing an original forming process in order to create a subframe of a hybrid aluminum-steel composition. The supporting and connecting structure between the individual cast nodes involves the use of profile elements which are made of steel material, in particular a steel pipe frame, which is embraced at least in some areas by an aluminum sheathing which assumes the complex surface configuration and complex attachment function. The profile elements extend hereby through the cast nodes which thus become hollow.

According to another feature of the present invention, the profile elements may be joined in the casting tool to form an open or closed frame. In other words, the frame forms a ring or two (open) ends. The hollow section for making the profile elements of the frame may be a circumferentially closed hollow section with thin-walled cross section. The frame may either be made from a long hollow section that has been bent several times to establish several portions that represent the profile elements, or from several separate profile elements which are joined to form the frame.

Such a hybrid subframe is lightweight as the cast nodes are hollow as a result of the disposition of the steel pipe frame inside the cast nodes. The stiffness, in particular the torsion stiffness is increased in absolute terms but also in relation to the overall weight of the subframe. Material costs are low since the proportion of aluminum is decreased compared to a subframe made entirely of aluminum. Unlike an extruded part, the shape of a profile element or frame of steel pipe can be modified in many ways along its length. In other words, the profile element or frame may be formed or joined with different cross sectional zones. The forming process may involve an internal high-pressure forming process or a compression molding process.

The union between the cast node and the profile element or frame can be realized in a form-fitting manner or force-locking manner. In view of the greater temperature shrinkage of aluminum, the aluminum cast node is drawn tightly from outside against the inner profile element, thereby realizing a press fit. This press fit is superimposed by a form fit between the profile element and the cast node. Of course, additional formfitting measures may, optionally, be provided on a profile element or frame. The form fit can be enhanced by forming formfitting elements at least in length portions which are then subjected to the casting process. The term "formfitting element" relates hereby to modifications of the cross section in length direction. Examples include embossments or protrusions in which liquid aluminum can flow during the casting process.

According to another feature of the present invention, the profile element or the frame may be bent, and the cast nodes are being cast in an area of the bending zones around the profile elements to enhance the form fit. The presence of cast nodes alone in the area of the bending zones prevents any shift in length direction of the cast node in relation to the profile element or frame. Likewise, the cast nodes are prevented from pivoting about the length axis of the profile element or frame.

According to another feature of the present invention, a holding element of steel may be secured, e.g. welded, to a profile element or frame before or after the casting process.

The subframe may be made of one part or of several parts so that complex and lightweight structures can be created, even when using a steel pipe.

According to another aspect of the present invention, a subframe for a motor vehicle includes a plurality of profile elements, each profile element made of a hollow section of steel, and a plurality of cast nodes made of aluminum material and connected to the profile element in spaced-apart relationship through casting around the profile elements.

After manufacturing a steel pipe frame or part thereof, i.e. a profile element, through bending, joining, hydroforming, and/or compression molding in the desired combination, the frame and/or part is placed in the casting tool which has appropriate recesses for receiving the frame or profile element or parts of the frame or profile element in order to form the cast nodes. This is followed by the casting process, whereby the cast nodes can be cast sequentially, i.e. individually, or combined in groups, or simultaneously. The steel-aluminum composite parts can then be joined to form a subframe after the casting process. As an alternative, the composite structure may form the subframe which can then be transferred for further processing.

Based on metallographic results before and after a corrosion resistance test (VDA Wechseltest, VDA 621-415) and based on solid analysis in ejection and torsion tests, hollow sections of steel St35 in combination with pre and post treatments appear to be most suitable for casting. Pretreatment of profile elements before casting may involve a combination of surface blasting followed by degreasing with subsequent optional preheating. Post treatment of cast nodes after casting involves sealing of transition zones between the profile element and the aluminum cast node and subsequent cathodic electrodeposition and results in good corrosion characteristics.

The transition between steel and aluminum can be sealed by using a 1-component heat hardening sealing material on epoxy/polyurethane basis. After applying cold sealing material, exposure to air moisture or temperature causes pre-hardening. The finished product exhibits good wash-out resistance after pre-hardening, suitability for sealing different metals (e.g. steel, aluminum) as well as powder coating capability and cathodic electrodeposition capability. When the system is exposed to air moisture at room temperature, a thin skin is formed on the surface which protects the sealing material from being washed out. Final hardening is realized through temperature impact, e.g. in a cathodic electrodeposition furnace. Infrared and induction facilities are also applicable for final hardening.

The process sequence in low-pressure sand casting can be divided into eight process steps:

1. Preparation/Separation

In the first process step, the profile element is prepared. This involves in particular a cuffing of the profile element to size. Of course, profile elements may already been delivered with the required length so that this process step may also be omitted.

2. Forming

Next, the profile element is formed to receive its final shape. Bending methods are applicable here in particular. When complex geometries are involved, methods assisted by active agents may be used, such as an internal high-pressure forming process. Additional form-fitting elements, like embossments for example, may be provided in the later connection zone as the profile elements are formed.

3 Pretreatment

Next, the profile elements are liberated from surface oxides and contaminants at least or exclusively in those regions that are to be cast later through a blasting process. In addition, the surface is roughened by the blasts. Subsequently, it is suitable to have the profile elements undergo a cleaning process in a degreasing bath.

4. Casting Preparation

Immediately before being subjected to low pressure casting in sand, the profile elements are heated in the region to be cast. Tests have shown a beneficial temperature in a range from 380° C. to 420° C., especially 400° C. Heating may be realized with hot air or inductive heating. Inductive heating has the benefit that the inductor geometry can be suited to heat only the area of the profile element which is intended for being cast. Risk of heat distortion is minimized in neighboring areas of the profile elements. In other words, the profile element can be heated to the desired temperature either in its entirety or only in those areas that are being cast. As induction heating has a high heat-up rate, it is possible to quickly heat the profile element. For example, a pipe having an outer diameter of 35 mm can be heated in 6 seconds along a length of 150 mm from 20° C. to 400° C.

5. Casting

When low pressure casting in sand is involved, the profile element is placed immediately after the heating process into a sand mold and cast around to prevent cooling. When large scale production is involved, other casting processes may also be envisioned, like, e.g., die casting. Die casting may not require a complete or partial heating of the profile element. Use of galvanized profile elements may in some instances also eliminate the need for cathodic electrodeposition.

6. Separation

Following the casting process, the functional areas of the subframe provided with cast nodes is machined through material removing processes. Examples include drilling or milling operations.

7. Sealing

Next, a sealing mass is applied in the transition between profile element and cast node of aluminum. A robot-assisted application unit may hereby be utilized.

8. Coating

After being applied, the sealing mass has to pre-harden, for example over a time period of 4 hours at a temperature of about 23° C. Following pre-hardening is cathodic electrodeposition for producing the subframe as finished product.

Handling of the components of the subframe between the processing steps can be executed with the assistance of robots. This maximizes reproducibility of the processes and same quality. The present invention thus enables the application of a low pressure sand casting process to reliably connect aluminum cast nodes with a steel pipe frame in order to produce a subframe for receiving components of the chassis and/or drive of a motor vehicle.

In basic tests, model nodes were produced in a low pressure sand casting process and various pipe materials (St35 and 1.4301) with different surfaces were examined during casting tests.

The metallographic tests show that pre-treatment of uncoated hollow sections effectively prevents the presence of shrinkage in the casting. Pre-treatment involves blasting of the pipe surface with the abrasive "AFESIKOS" marketed by Asikos Strahimittel GmbH, Germany. This abrasive involves a synthetic mineral which is free of iron according to ISO 11126, i.e. an aluminum silicate melt with a specific weight of 2.6 g/cm$^3$. Grain size ranges from 0.2 to 0.5 mm at 2 bar impingement pressure. Cleaning is followed by degreasing with acetone and subsequent pre-heating of the profile elements to a temperature of 400° C. The examination of coated profile elements in the form of pipes (St35 hot-galvanized, St35 hot galvanized and heat-treated, St35 electrogalvanized) has shown increasing shrinkage and cracking which could not entirely be reduced with pre-treatment. The presence of a new intermediate layer with good adhesiveness could be shown in hot galvanized profile elements of St35 after casting in the transition zone between aluminium and steel.

Pretreatment In pipes made of materials St53 and 1,4301 resulted in good flow of melt. Ageing tests have shown that hollow sections of St35 have good corrosion results due to the combination of sealing and cathodic electrodeposition. Penetration of moisture into the connection zone between hollow section and cast nodes could be prevented.

Ejection experiments have shown that highest strength of up to 60 kN have been achieved for hot galvanized pipes. This can be attributed to the presence of the intermediate layer which forms on the pipe during casting. Uncoated pipes of St35 showed a much greater influence of the test temperature upon the strength of the connection as a consequence of the different coefficient of thermal expansion between steel and aluminum. It has been shown that the connection strength decreases as the temperature increases. Ageing did not influence the breakaway force in the ejection experiment of cast and subsequently sealed St35 pipes. Without heat treating aluminum after casting, higher breakaway forces have been noted and a greater migration of aluminum particles on the pipe surface have been observed. The connection strength is similarly affected when the pipe surface is exposed to blasting. When surfaces of pipe material St35 were exposed to a blasting process, the breakaway forces are higher and aluminum particles migrated to a greater extent in the ejection process compared to pipes that are not subjected to blasting. The pipe material also impacts the breakaway forces in the ejection experiment. In St35 pipes with blasted surface and heat treatment, breakaway forces of 30 kN were determined. In pipes of 1.4301 and same parameters, the breakaway forces were 14 kN and thus significantly lower. This can possibly be attributed to the fact that blasting of the pipe surfaces causes different steel materials to have different surface structure and thus different magnitudes of breakaway forces.

Torsion experiments also showed different breakaway forces for pipe materials St35 (1.4 kN) and 1.4301 (0.9 kN) in cast nodes with an overlap of a length of 45 mm. Furthermore, tests with cast pipes of St35 also showed that the correlation between overlap length and breakaway moment is non-linear. In addition, pipes of St35 showed after being cyclically damaged that the connection strengths in the torsion experiment decreases.

It is expected that higher cool-down rates and higher casting pressure in the die casting process render casting of coated hollow profiles less problematic than when low pressure sand casting is involved. In some instances, a change of the casting process may also simplify the pretreatment of the pipes, i.e. pre-heating and blasting in particular may be omitted.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
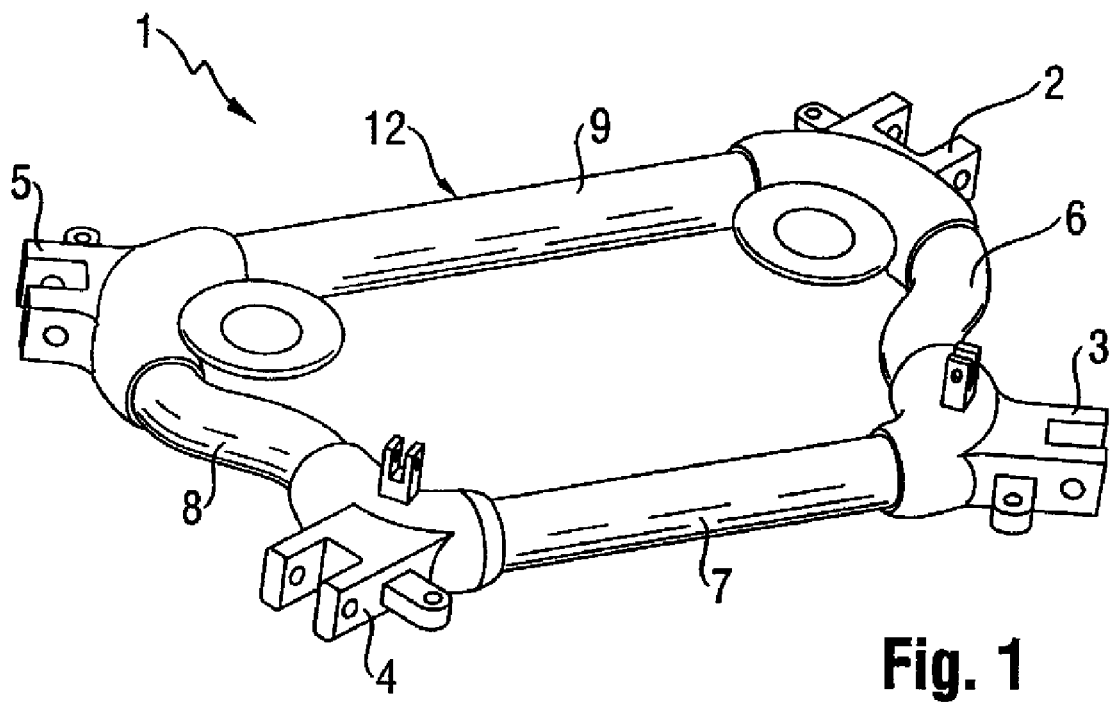
FIG. 1 is an isometric illustration of one embodiment of a subframe according to the present invention for use in a motor vehicle, in closed configuration.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an isometric illustration of one embodiment of a subframe, also called chassis frame, in accordance with the present invention, generally designated by reference numeral 1, for use in a motor vehicle such as a passenger car. The subframe 1 has four cast nodes 2, 3, 4, 5, which are respectively arranged in corner zones of the subframe 1, and profile elements 6, 7, 8, 9 which extend between the respective cast nodes 2, 3, 4, 5. The subframe 1 shown in FIG. 1 has a closed configuration to form a closed frame 12.

Figure 2:
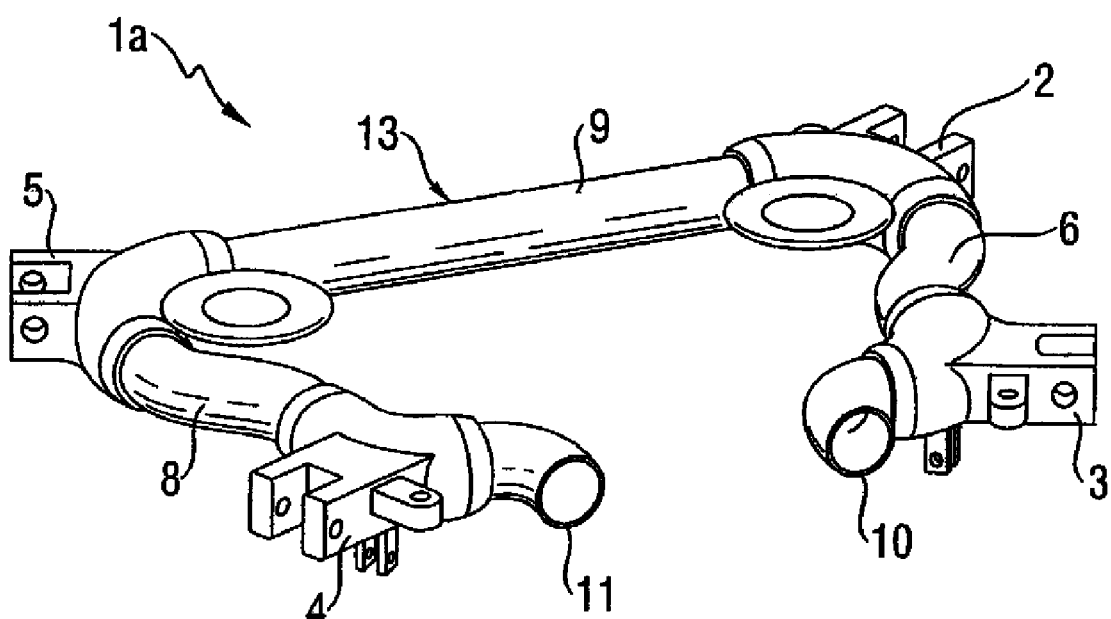
FIG. 2 is an isometric illustration of another embodiment of a subframe according to the present invention for use in a motor vehicle, in open configuration.

FIG. 2 shows an isometric illustration of another embodiment of a subframe according to the present invention, generally designated by reference numeral 1a, for use in a motor vehicle. Parts corresponding with those in FIG. 1 are denoted by identical reference numerals and not explained again. The description below will center on the differences between the embodiments. In this embodiment, the subframe 1a has an open configuration. This can be achieved, e.g. by cutting the profile element 7 in FIG. 1 to expose ends 10, 11 of a frame 13 in spaced-apart relationship. FIG. 2 shows that the individual profile elements 6, 7, 8, 9 are formed from a hollow section which may be a circumferentially closed thin-walled steel pipe to form the supporting frames 12 or 13 of the subframe 1 or 1a, respectively.

Figure 3:
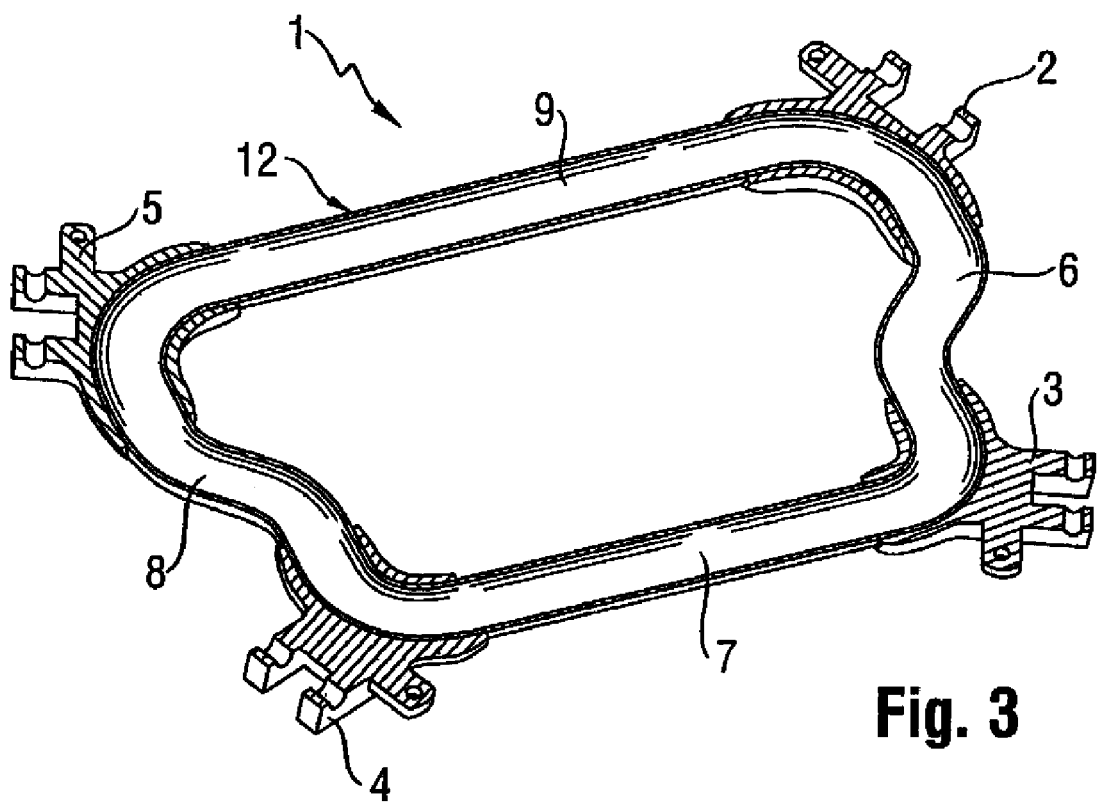
FIG. 3 is an isometric illustration of the subframe of FIG. 1 which has been cut open.
Figure 4:
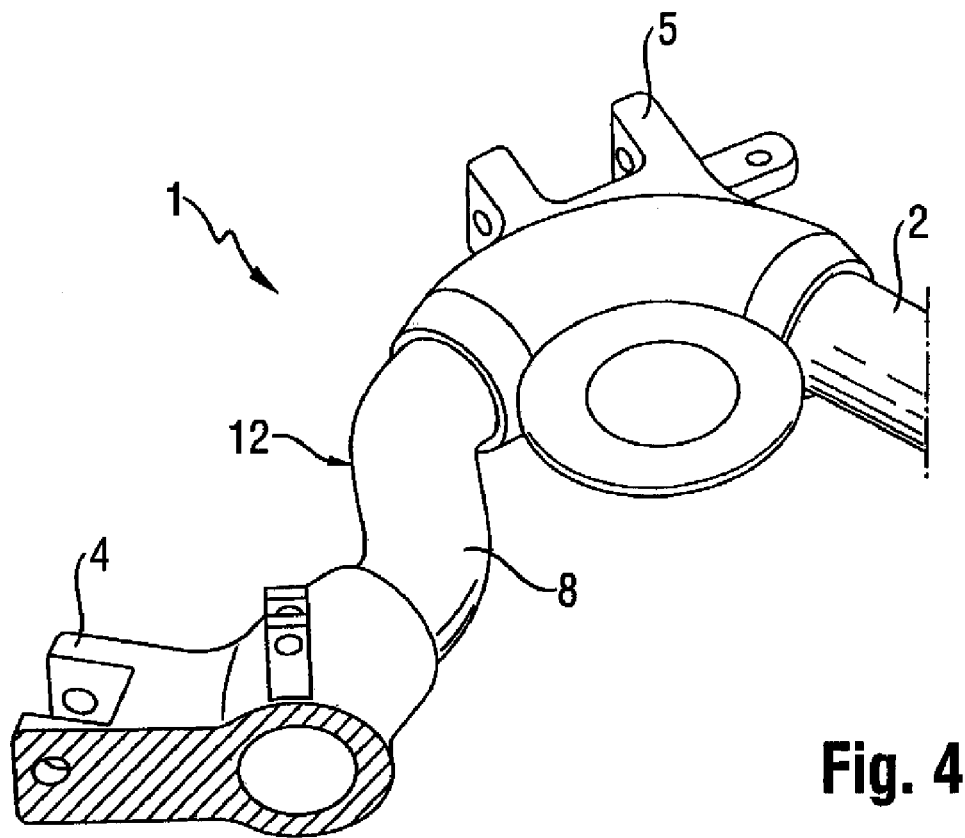
FIG. 4 is a detailed cutaway view, on an enlarged scale of the subframe of FIG. 1.

In the non-limiting exemplified embodiments, shown in FIGS. 1 and 2, the individual profile elements 6, 7, 8, 9 are not separately connected with the individual cast nodes 2, 3, 4, 5, since the frame 12, 13 is a continuous structure which also passes through the cast nodes 2, 3, 4, 5. The cast nodes 2, 3, 4, 5 are cast by an original forming process externally about the frame 12, 13, as shown in FIGS. 3 and 4 which illustrate broken-up views of the subframe 1. The material of the cast nodes 2, 3, 4, 5 is provided solely on the outside of the frame 12. In other words, the cast nodes 2, 3, 4, 5 are hollow on the inside.

The form fit between the cast nodes 2, 3, 4, 5 and the frame 12, 13 is realized, i.a., by bending the frame 12, 13. In other words, the cast nodes 2, 3, 4, 5 are arranged in the bent corner zones of the frame 12, 13 so as to embrace the frame 12, 13 in the form of a sleeve. In this way, the cast nodes 2, 3, 4, 5 are prevented from shifting in length direction as well as from pivoting about the length axis of the frame 12, 13.

FIGS. 3 and 4 also show that the cast nodes 2, 3, 4, 5 have walls that are significantly thicker than the thin-walled steel pipe which is embedded in a formfitting manner in midsection of the cast nodes 2, 3, 4, 5.

Figure 5:
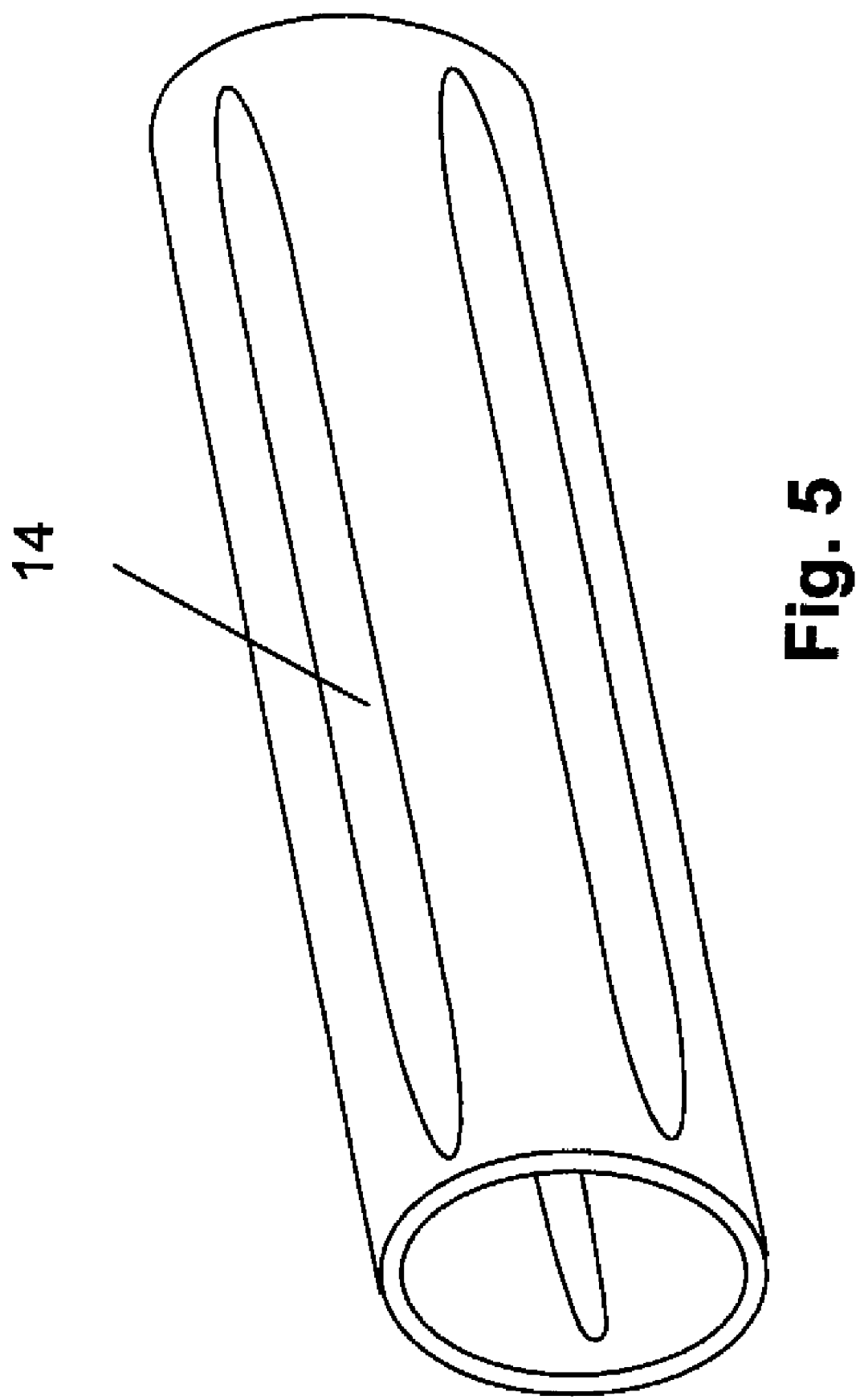
FIG. 5 is a perspective cutaway view of a profile element with a formfitting element in a length portion thereof.

Referring now to FIG. 5, there is shown a perspective cutaway view of a profile element 6, 7, 8, 9 with a formfitting element in the form of an embossment 14 in a length portion thereof. The term "formfitting element" is to be understood as relating to any modification of the cross section in length direction. Another example involves protrusions in which liquid aluminum can flow during the casting process.

Although not shown in detail, a holding element of steel may be secured, e.g. welded, to a profile element 6, 7, 8, 9 or frame before or after the casting process. An example of a holding element includes weld-on elements for securement of cables, pipe elements, mounts or exhaust components.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method of making a subframe of a motor vehicle for receiving components of the chassis and/or drive unit of the motor vehicle, comprising the steps:
   placing a profile element having at least one arc-shaped corner zone and made of a hollow section of steel in a casting tool; and
   filling aluminum material into the casting tool to cast around the arc-shaped corner zone of the profile element so as to form at least one cast node around the corner zone of the profile element.

2. The method of claim 1, further comprising the step of forming at least one formfitting element in a length portion of the profile element in at least one area thereof before the length portion is subjected to the casting step.

3. The method of claim 1, further comprising the step of bending the profile element to form at least one bending zone, said cast node being cast in an area of the bending, zone around the profile element.

4. The method of claim 1, further comprising the step of forming the profile element with different cross sectional zones.

5. The method of claim 4, wherein the forming step includes an internal high-pressure forming process.

6. The method of claim 1, wherein the forming step includes a compression molding step.

7. The method of claim 1, further comprising the step of securing a holding element to of the profile element before or after the casting step.

8. A subframe for a motor vehicle, comprising:
   a profile element made of a hollow section of steel and having at least one arc-shaped corner zone; and
   at least one cast node made of aluminum material and connected to the profile element in the arc-shaped corner zone through casting around the corner zone of the profile element.

9. The subframe of claim 8, wherein the profile element is configured to form an open frame.

10. The subframe of claim 8, wherein the profile element is configured to form a closed frame.

11. The subframe of claim 8, wherein the profile element has at least one portion of varying cross sectional zones.

12. The subframe of claim 8, further comprising at least one formfitting element formed on the profile element in an area of the cast node.

13. The subframe of claim 8, wherein the profile element is made through an internal high-pressure forming process.

14. The subframe of claim 8, wherein the cast node is hollow.

15. The subframe of claim 8, further comprising a plurality of said cast node arranged in spaced-apart relationship in corner zones of the profile element.

16. The subframe of claim 8, further comprising a further cast node arranged at a distance from an end of the profile element.

17. The subframe of claim 8, wherein the hollow section is a thin-walled and closed steel pipe.

* * * * *

UNITED STATES PATENT AND TRADEMARK OFFICE
CERTIFICATE OF CORRECTION

| | |
|---|---|
| PATENT NO. | : 7,971,887 B2 |
| APPLICATION NO. | : 12/108098 |
| DATED | : July 5, 2011 |
| INVENTOR(S) | : Jochen Dörr and Michael Wibbeke |

It is certified that error appears in the above-identified patent and that said Letters Patent is hereby corrected as shown below:

Column 4, line 63: Replace "Strahimittel" with --Strahlmittel--;

Column 8, line 13, claim 7: delete "of" before --the profile--.

Signed and Sealed this
Eighth Day of November, 2011

David J. Kappos
*Director of the United States Patent and Trademark Office*